Sept. 19, 1939. H. T. GOSS 2,173,477
FLUID DISPENSING APPARATUS
Filed May 6, 1931 8 Sheets-Sheet 6
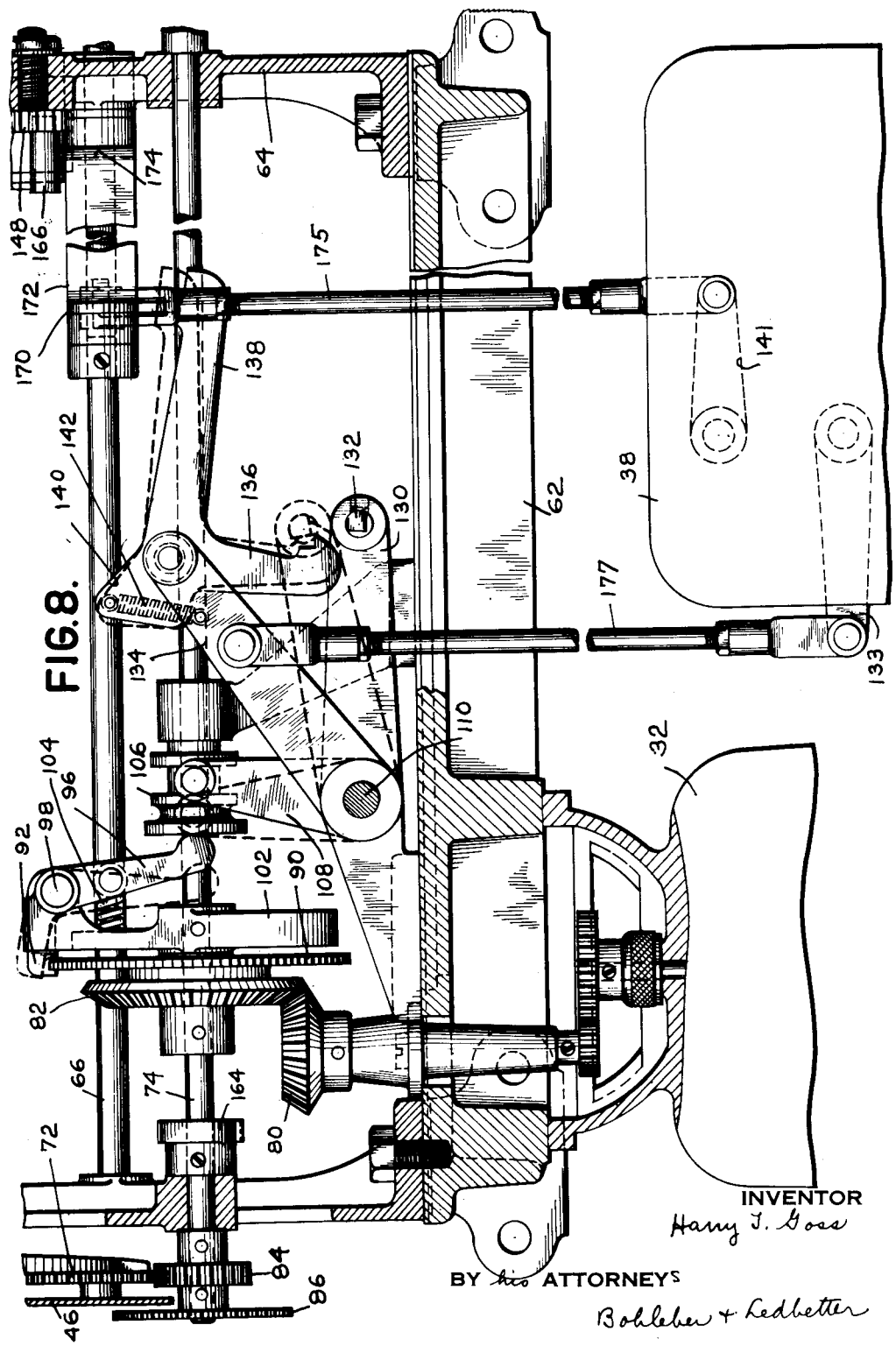
INVENTOR
Harry T. Goss
BY his ATTORNEYS
Bohleber + Ledbetter

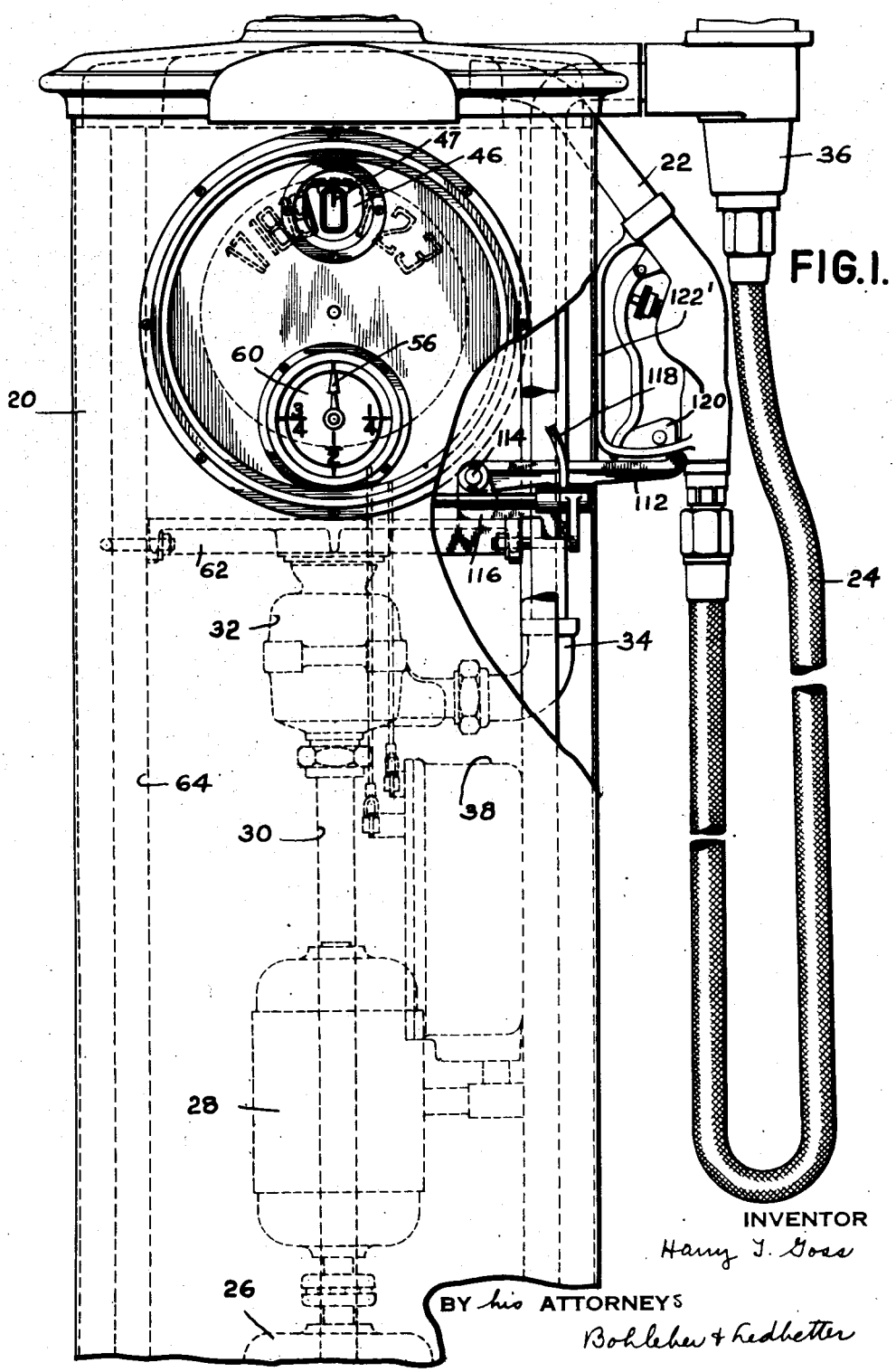

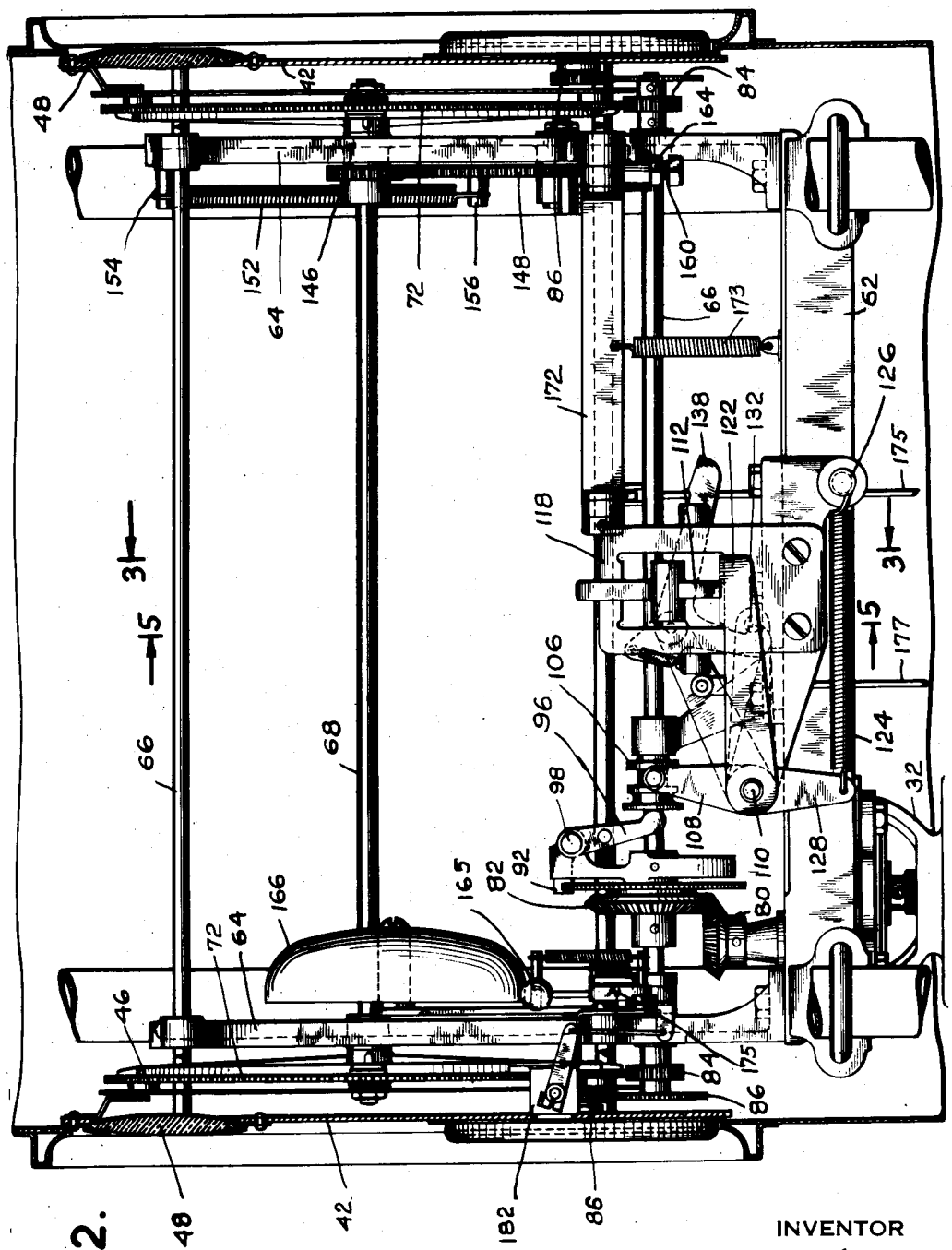

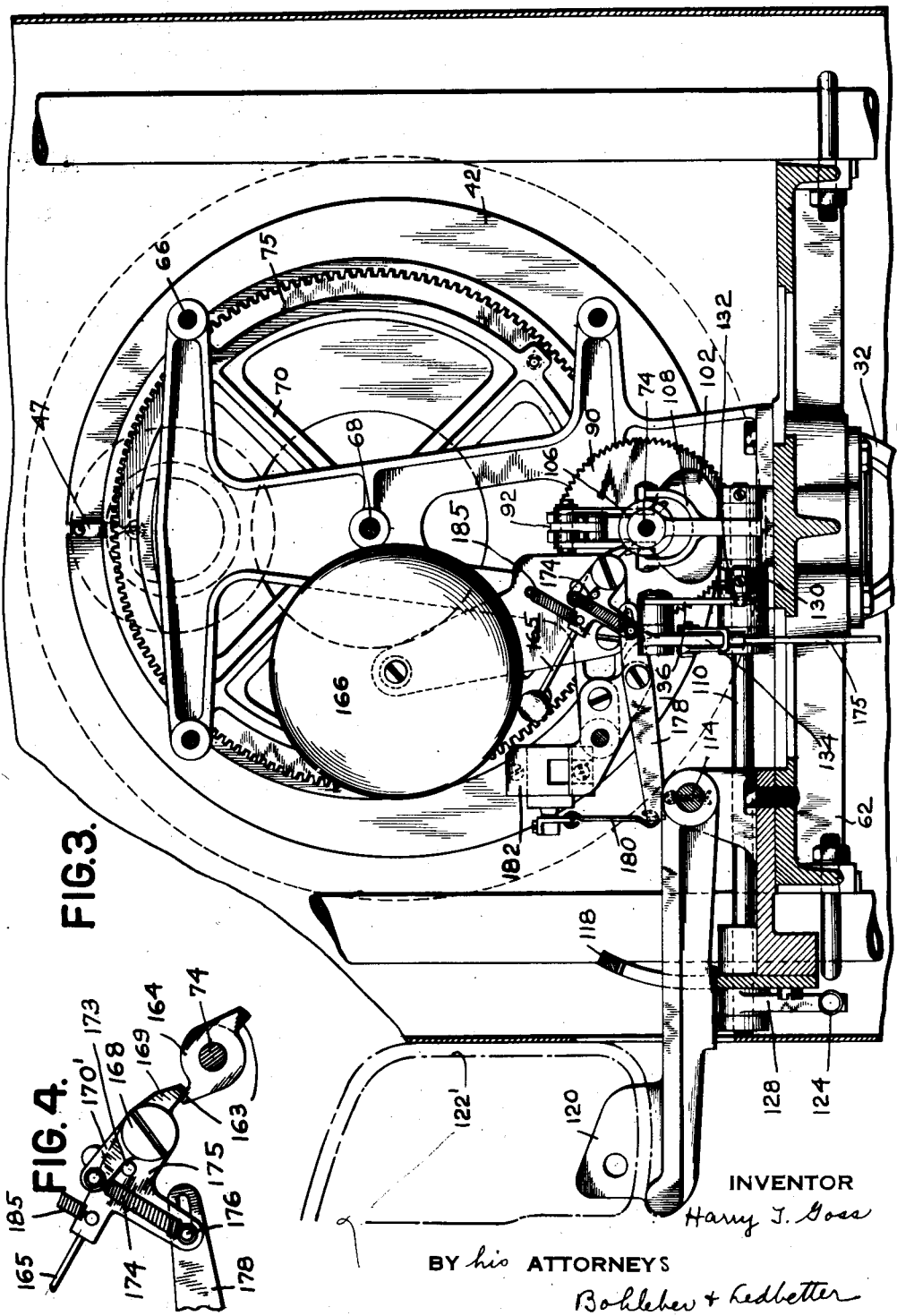

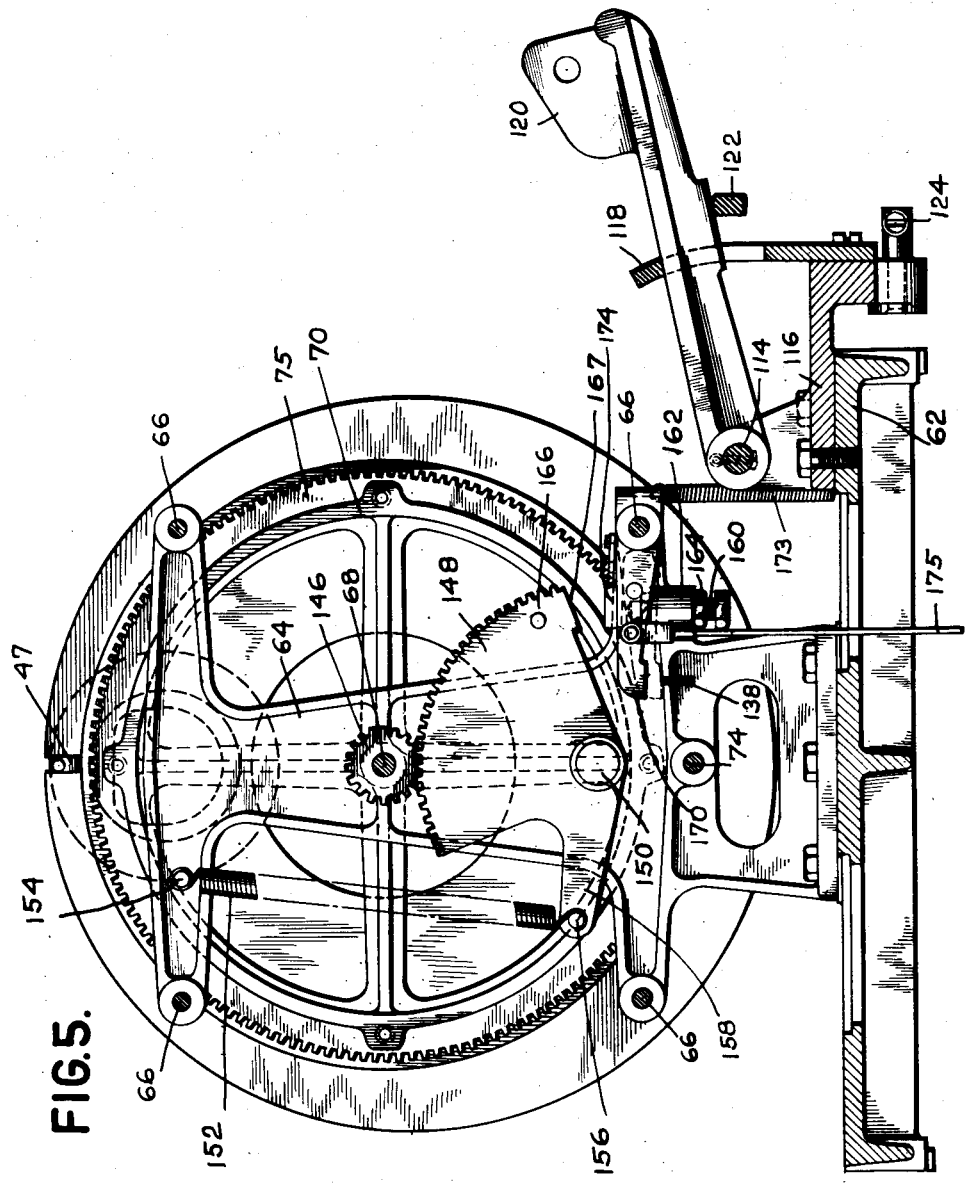

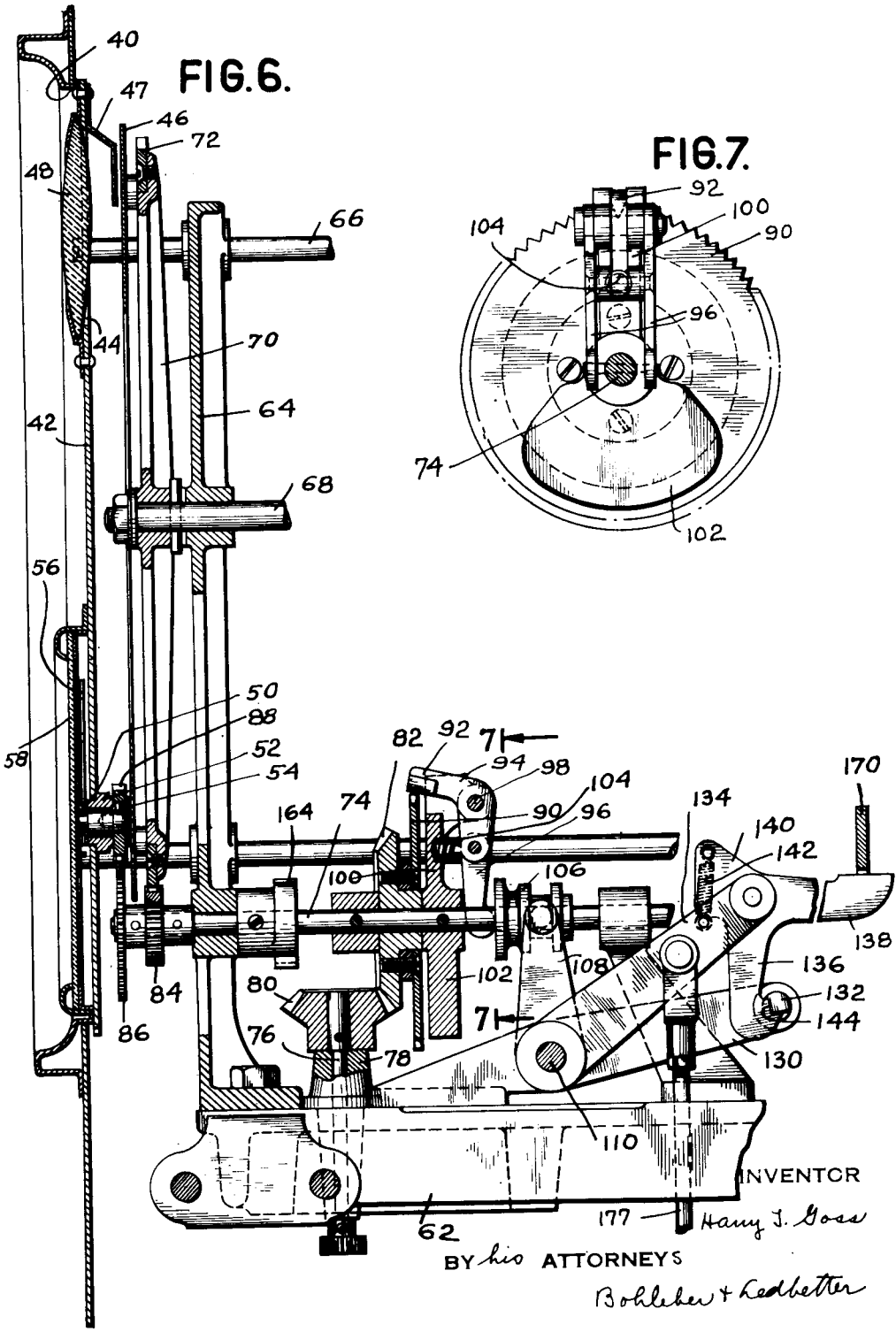

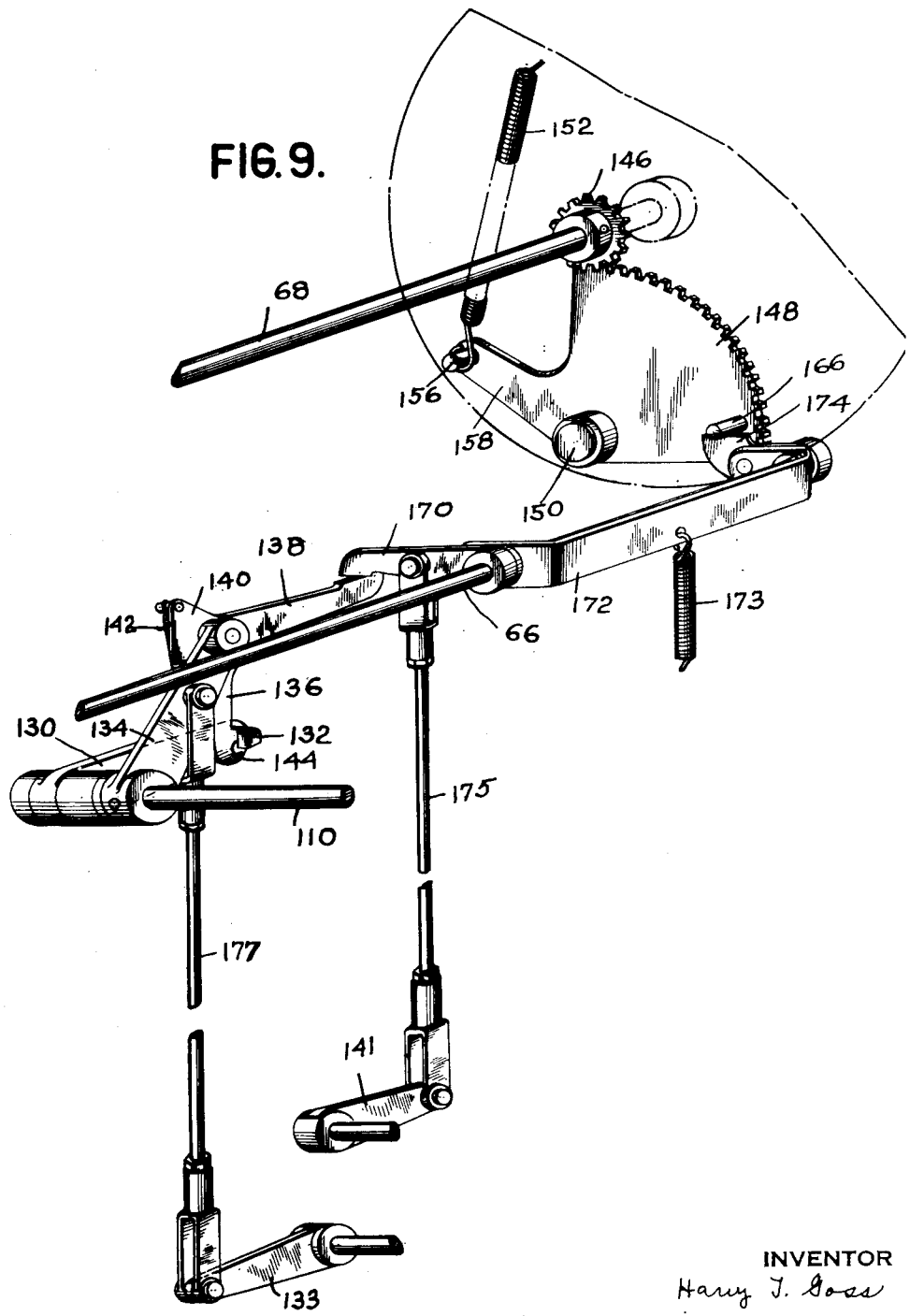

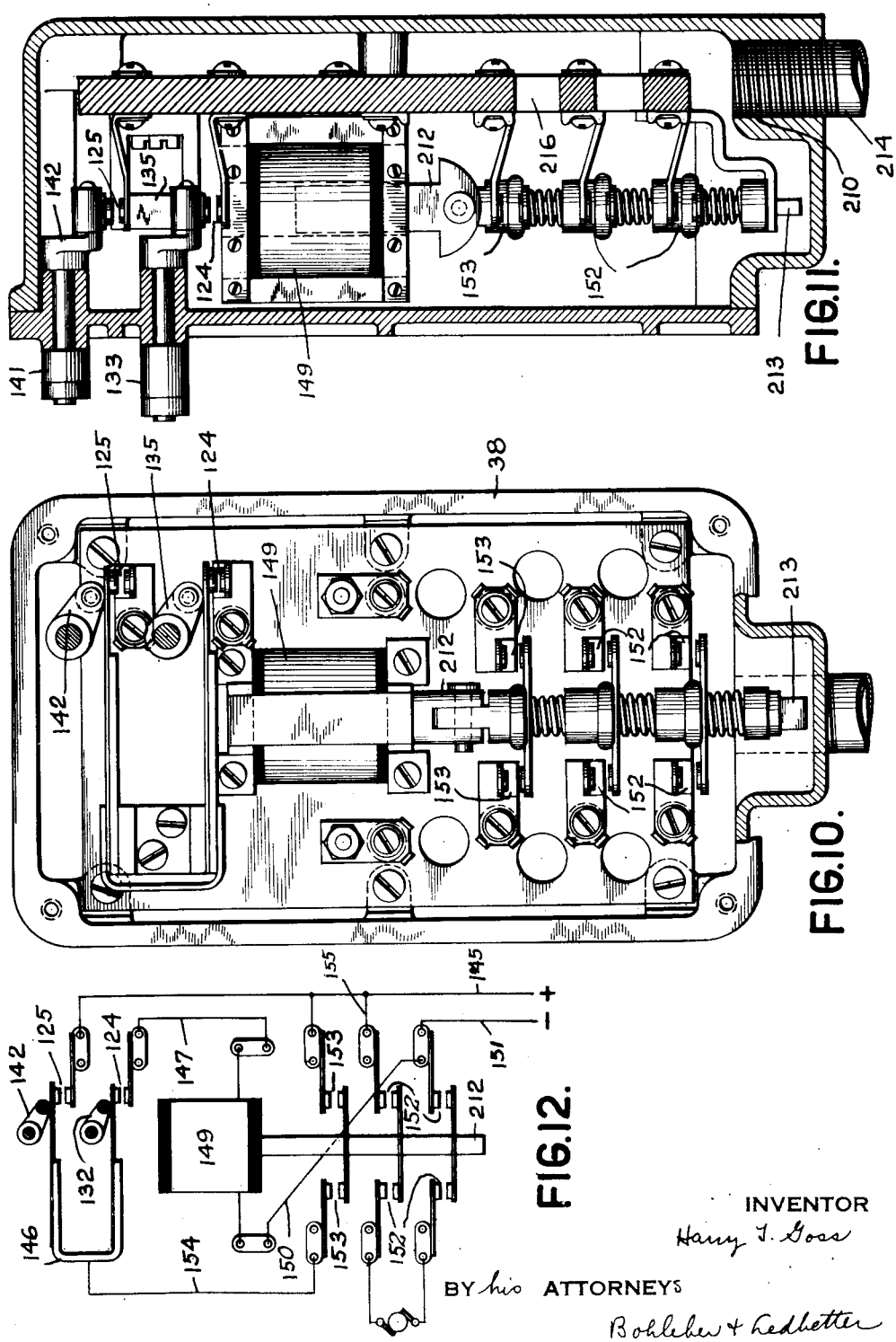

Patented Sept. 19, 1939

2,173,477

UNITED STATES PATENT OFFICE 2,173,477

FLUID DISPENSING APPARATUS

Harry T. Goss, Rutherford, N. J.; Marie Nelson Goss, executrix of said Harry T. Goss, deceased, assignor to L. N. S. Corporation, New York, N. Y., a corporation of Delaware Application May 6, 1931, Serial No. 535,335

27 Claims. (Cl. 221—95)

This invention relates broadly to fluid dispensing devices such as are adapted to dispense gasoline and other liquid fuels at roadside service stations and the like, of the kind in which the pump is automatically actuated, as by a motor, whereby the delivery is continuous and the salesman, instead of operating a pump handle to serve the fluid may stand at the vehicle tank where he can see exactly how much the tank will hold and serve it without spilling.

In fluid dispensing devices heretofore known, the volume of fluid delivered from the nozzle has been indicated by pointers travelling over a graduated dial, which pointers were manually returned to zero. The disadvantage of a dial with a manually reset pointer is that a dishonest salesman, by working quickly, can fail to return the pointer all the way to zero and so short measure the purchaser.

One object of the present invention is to provide indicating mechanism for a fluid dispensing device in which the return to initial position or zero of the indicator is automatic, in the sense that, once the return to zero is initiated, it cannot be manually halted before the indicating means reaches initial position.

Another object of the invention is to prevent tampering with the devices indicating the units of fluid delivered, when a sale is being made. To this end, the indicator returning devices are disposed within the housing so that access thereto cannot be had.

It is also an object to avoid confusion in reading the indication of the units of fluid delivered. Accordingly, indicating mechanism is provided wherein the only figure visible to the purchaser and salesman is the number of, say, gallons actually delivered in that transaction.

It is a further object of the invention that the indication of the number of units of fluid purchased shall remain visible until the next transaction.

The invention also seeks the initiation of the operation of the device automatically upon removal of the nozzle from its support. To this end, the source of power and a clutch between the metering device and the registering mechanism is controlled by the nozzle when on its support and the operation of devices actuating the clutch is initiated by the removal of the nozzle from the support.

Yet another object of the invention is the control of the initiation of the actuation of the fluid delivery means by the nozzle. The source of power, for instance, the motor circuit, is rendered inoperative when the nozzle is on its support and rendered operable by devices released by the removal of the nozzle from its support.

Still another object of the invention is the automatic initiation of the operation of the fluid elevating means. Accordingly, the operation of the fluid elevating means is initiated by the return of the indicating means to initial position.

In realizing the invention, the nozzle by which the fluid is delivered, say, to the tank of a motor vehicle is normally carried upon a movable support when in inactive position. So soon as the nozzle is lifted from its support, the indicating devices, such as the dials, are released from the drive by the meter and are permitted to be returned to zero position by suitable power means. When the indicating means returns to initial position, the metering devices are immediately reconnected thereto and the fluid elevating means automatically commences to function to deliver fluid. After the desired quantity of fluid has been delivered and the nozzle returned to its support, the fluid elevating means is caused to cease operation but the indicating means remains operatively connected to the metering means so as to retain the indication of the number of units of measure of fluid delivered until the next transaction.

These and other objects of the invention and the means for their attainment will be more apparent from the following detailed description, taken in connection with the accompanying drawings illustrating one embodiment by which the invention may be realized, and in which:

Figure 1 is a view showing, in elevation, a fragmentary portion of a fluid dispensing standard provided with means whereby the number of units of fluid dispensed is indicated to the purchaser, a portion of the standard being broken away to show details of the nozzle support in accordance with this invention.

Figure 2 is a view showing, in side elevation, the index mechanism of the fluid dispensing device, looking, say from the right in Figure 1.

Figure 3 is a transverse vertical sectional view of the index mechanism taken in the plane indicated by the line 3—3 in Figure 2 and looking in the direction of the arrows and showing specifically the nozzle support, bell and counter mechanism.

Figure 4 is a detail view showing the cam and pawl which operates the bell and counter.

Figure 5 is a sectional view taken in a transverse vertical plane indicated by the line 5—5 of Figure 2 and looking in the direction of the arrows and showing particularly the return to zero mechanism.

Figure 6 is a longitudinally vertical sectional view taken in the plane indicated by the line 6—6 of Figure 1, looking in the direction of the arrows and showing particularly the clutch mechanism interposed between the meter shaft and the index dial and the actuating mechanism for the clutch.

Figure 7 is a detail of the clutch mechanism taken in the plane indicated by the line 7—7 in Figure 6.

Figure 8 is an enlarged sectional view of the lower part of the structure shown in Figure 2 with the parts in the same position but with certain of the mechanism omitted in the interest of clearness, showing in dotted lines the position of parts when the index mechanism is disconnected from the meter shaft and also showing the connection between this mechanism and the controls for the electrical circuit.

Figure 9 is an isometric view showing the mechanism which controls the sequence of operation of the apparatus but with associated parts removed in the interest of clearness.

Figure 10 is a view showing the interior of the control box and the several sets of contacts and other controlling mechanism.

Figure 11 is a sectional view of the control box taken in the plane indicated by the line 11—11 of Figure 10 and looking in the direction of the arrows.

Figure 12 is a somewhat schematic view showing the various control and holding circuits of the mechanism.

Referring first to Figure 1, in the illustrated embodiment, a dispensing standard or housing 20 of any convenient shape, is adapted to support and contain the devices for elevating liquid from a tank (not shown), say, beneath the ground and measuring it for delivery from a valve controlled nozzle 22 on the end of a hose 24 into say, the fuel tank of a motor vehicle. Liquid flow establishing means such as a pump 26, driven by the motor 28, elevates the liquid through the pipe 30 to meter 32 from which the liquid passes by a pipe 34 to the connection 36 for the hose 24. The pump 26, motor 28, meter 32 and a control box 38 containing the contacts for the motor circuits are indicated in dotted lines in Figure 1.

In the front of the housing and at a desirable elevation where it may be easily visible or, if desired, in both the front and back walls thereof, the housing 20 is formed with openings 40, (Figure 6) preferably circular, closed by a circular cover member 42 which in turn is formed with an opening 44 by which the dial 46 indicating the number of units of measure of fluid delivered from the nozzle 22 is visible. Behind this opening 44 is an index finger 47 indicating the initial or zero position of the dial 46. This opening 44 is conveniently closed by a magnifying lens 48. Also formed in the cover member 42 is an opening 50, containing a bearing 52 for the stub shaft 54 upon which a pointer 56 is mounted, outwardly of the cover 42 and within a transparent closure 58 carried thereby. The pointer 56 is adapted to travel over a dial 60 (Figure 1) to register fractions of the units of measure of the fluid delivered.

The mechanism indicating the units of measure of the fluid delivered from the nozzle 22 is supported upon and above a transversely extending supporting means shown as a transverse frame 62, referred to hereinafter for convenience as a platform, carried upon pillars 64 extending upwardly within the housing 20 from the base of or support for the structure and which platform 62 also carries below it, if desired, the meter 32. Upon the platform 62 at the front and rear thereof, respectively, between the pillars are bearing frames 64 (Figure 2) which are suitably braced and spaced by the spacing rods 66 which pass through the frames 64 and abut, if desired, against the front and rear walls of the dispensing standard or housing 20.

Journalled preferably substantially centrally of the bearing frames 64 is a freely rotatable dial shaft 68 on the outer ends of which, outwardly of the frames, are spiders 70 each carrying a ring gear 72 and a dial 46. Also journalled in the bearing frames 64, in a lower part thereof, is the jack shaft 74.

During the delivery of the fluid, its flow through the meter 32 causes a rotation of the meter shaft 76 once for each unit of measure of fluid passing therethrough. The meter shaft 76 is journalled in a bearing 78 carried by the supporting frame 62. The upper end of the meter shaft 76 carries a bevelled pinion 80 which meshes with a bevelled gear 82 loosely mounted on the transverse jack shaft 74 to which it may be clutched to cause the jack shaft 74 to be rotated by the meter 32 and from which it may be declutched to permit the dials to be rotated, say, in the opposite direction independently of the meter shaft, in returning them to zero position. The ratio of the bevel pinion 80 and gear 82 is such that the jack shaft 74 makes one-half revolution for each unit of measure of fluid delivered. The jack shaft 74 drives, through a pinion 84 on its end, outwardly of the bearing frame 64, the ring gear 72 carried with the dial 46. Thus the dial 46 is rotated from the meter shaft 76 in direct relation to the number of units of measure of fluid passing through the meter 32. Also carried with the jack shaft 74 is another pinion 86 meshing with the pinion 88 on the stub shaft 54 whereby the split gallon pointer 56 is rotated.

While various types of clutch means may be adopted between the meter shaft 76 and the jack shaft 74, there is illustrated in the drawings, a clutch which is particularly effective for the purpose at hand. A disc 90 of relatively large diameter is carried by the bevel gear 82 and is formed with a relatively large number of teeth adapted to be selectively engaged by a clutch finger or detent 92 comprised in the companion clutch element fixed to the jack shaft 84. This clutch finger 92 is formed on one arm 94 of a bell crank like lever 94—96 which is pivoted between its ends, as at 98, on arm 100 fixed on the jack shaft 74 to rotate therewith, the arm 100 having a diametrically opposite extension 102 or counterweight to balance the weight of the clutch elements 92—96 and render smoother and more even the rotation of the jack shaft 74. A spring 104 between the arm 100 and the lever arm 96 normally urges the detent 92 into engagement with the opposing toothed disc clutch member 90. It will be apparent that the greater the number of teeth on the disc 90, the more promptly and more exactly the clutch parts 90, 92 will come into engagement and thus great precision is obtained in the action for a purpose which will be brought out more fully hereinafter.

The clutch is preferably actuated by a collar 106 freely slidable on the jack shaft 74 adapted to be moved into engagement with the clutch arm 96 by which the detent 92 is moved out of engagement with the teeth on the disc 90 against the action of the spring 104 and the jack shaft 74 is declutched from the meter shaft 76. This clutch operating collar 106 is actuated by a forked clutch operating lever 108 (Figure 8), loosely mounted upon a transversely extending operating shaft 110. The rotation of this operating shaft 110 through a predetermined angle to clutch and declutch the jack shaft is effected by the weight of the nozzle 22 on its support through an intermediate instrumentality, hereinafter to be described more in detail. Suffice it to say at this point that in the illustrated embodiment, the clutch operating lever 108 forms one arm of a bell crank 108, 130 or the equivalent, the other arm 130 of which is adapted to be moved in a counter-clockwise direction by a latching pawl 136 engaging therewith, which is carried by an arm 134 fixed on the operating or rock shaft 110.

As seen in Figure 1, the nozzle support takes the form of a lever 112 pivoted as at 114 in a bearing 116 on the supporting platform 62 and movable between elevated and depressed positions within a slotted guide frame 118. As shown in the drawings, Figures 1 and 5, the nozzle supporting lever 112 has an upwardly extending tongue 120 which may pass through a slot in the guard 122' on the nozzle, thereby holding the nozzle on the support. Obviously, any movable support for an element of the delivery hose is within the purview of the invention.

Beneath the free end of the lever 112 is the free end of an arm 122 (Figure 2) also fixed on the operating shaft 110, so that when the nozzle is raised off the supporting lever the arm 122 may move upwardly and rotate the operating shaft 110 in a counter-clockwise direction, as viewed in Figure 2, thereby moving, by means of lever 134 and lock pawl 136, the clutch operating lever 108 through an angle in a counter-clockwise direction to depress the clutch detent arm 96 and release the clutch. The shaft 110 is normally urged to turn in a counter-clockwise direction by a spring 124 connected at one end to a lug 126 on the frame 62 and at its other end to the end of a downwardly directed arm 128, fixed on the shaft 110. This spring 124 is of sufficient strength to turn the shaft 110 and cause the disengagement of the clutch 90, 92 when the nozzle 22 is off its support 112, but is insufficient to raise the arm 112 against the weight of the nozzle 22.

For convenience in manufacture, arms 122 and 128 may be formed as a unitary bell crank lever instead of as separate arms fixed on the operating shaft 110.

As has been pointed out hereinbefore, the purpose of disconnecting the jack shaft 74 from the meter shaft 76 is to permit the indicating means 46 and 56 to be returned to zero preparatory to recording the delivery of fluid in the next transaction. In order to prevent a dishonest operator from stopping the indicating means before such means has travelled all the way back to initial or zero position and commencing to deliver fluid with the dial registering from that advanced point, latching means are provided which engages the clutch operating lever in clutch releasing position and holds it in such position until the indicating means reaches initial position, when the clutch operating lever is released. It is also not until such time that the pump is permitted to operate. The mechanism for accomplishing this function is illustrated in Figures 6 and 9.

Freely rotatable on the operating shaft 110 is an arm 130 proximate the clutch operating arm 108 and secured thereto to turn therewith and which may, if desired, be integral with the clutch operating arm 108 to form, in effect, a bell crank lever. At the end of this arm 130 is a stud 132. Also carried on the shaft 110 and fixed thereto is an arm 134 carrying pivotally at its end a latching pawl 136. The latching pawl 136 has a tripping arm 138 extending outwardly away from operating shaft 110, and an arm 140 extends generally toward the shaft 110. A tension spring 142 connected at one end to the arm 140 and at its other end to the arm 134, causes the latching pawl 136 to normally tend to turn in a counter-clockwise direction, (as viewed in Figure 6) to cause a notch 144 at its end to engage, at certain times, the lug 132 on the arm 130 of the clutch operating bell crank lever 108, 130 to shift the clutch detent arm 96. Thus when the weight of the delivery means is on its supporting lever 112 and the shaft 110 rotated to its extreme position in a clockwise direction (as viewed in Figure 6) the arm 134 is depressed. At the same time, the clutch spring 104 forces the lever arm 96 of the clutch detent lever toward the right (as viewed in Figure 6) and permits the parts to engage. The latching lever 136 is beneath the lug 132 and is urged in engagement therewith by the latch spring 142. When the weight of the delivery means is removed from the support, the spring 124 causes shaft 110 to rotate in a counter-clockwise direction, the rotation of shaft 134 raises the latching pawl 136, which at that time is in engagement with the lug 132 carrying the lever arm 130 with it to also turn in a counter-clockwise direction to throw the clutch and release the jack shaft 74 from the meter shaft 40 during the time that the indicating means 46 and 56 are returning to zero position.

It will be readily appreciated that when the jack shaft 74 is released from the meter shaft 76 by the separation of the clutch elements 90, 92 upon removal of the nozzle 22 from its support 112 that the dials 46 are freely rotatable in either direction, the jack shaft 74, of course, turning with the dials 46. Provision is made for returning the dials to initial or zero position when so released.

Fixed on the dial shaft 68 is a pinion 146 in mesh with a segmental gear 148, pivoted as at 150 on a fixed part of the framework. A spring 152 (or other power means) secured at one end as at 154 to a fixed part of the frame, is secured at its other end 156 to the arm 158 of the segmental gear 148. When the jack shaft 74 is clutched to the meter shaft 76 and rotated thereby, the dial 46, of course, rotates from zero to register the number of units of measure of the fluid delivered. This rotation, with the consequent rotation of the pinion 146 moves the segmental gear 148 about its pivot 150 against the action of the spring 152 and puts the spring under tension. When the jack shaft 74 is disconnected from the meter shaft 76, the spring 152 causes the segmental gear 148 to turn about its pivot 150 in the opposite direction, thereby rotating the pinion 146 and dial 46 back to zero.

Stop means are provided to halt the zero of the dial at initial position. As shown, a fixed stop 160 is preferably adjustable in a bearing 162 on the frame and is locked in position by the lock nut 164. A part 167 of the segmental gear

148 is brought against this limiting stop 160 to halt the zero on the dials 46 at the index 47.

The return of the indicating means 46 to initial position causes the reconnection of said indicating means with the driving means therefor so that the indicating means may be again moved to measure the units of fluid delivered. It will be recalled that when the weight of the nozzle 22 is removed from the supporting lever 112, the jack shaft 74 is declutched from the meter shaft 76 and one arm 130 of the clutch operating lever 108, 130 is retained in clutch releasing position by the latching pawl 136. When the dial 46 reaches zero position, the latching pawl 136 is released so that the clutch operating lever 108, 130 may rotate in a counter-clockwise direction under the influence of the clutch spring 104 thereby permitting the clutch elements, detent 92 and toothed disc 90, to be reconnected.

A preferred form of releasing means for the latching pawl 136 is illustrated in Figure 9. The latching or hook pawl 136 is generally held in latching engagement with the clutch lever because of the tendency of the arm 140 to rotate in a counter-clockwise direction under the influence of the hook pawl spring 142. A rocking device is provided to release the hook pawl 136 when the dial 46 reaches zero position. As shown, there is pivoted upon an element of the frame-work, say, a spacing rod 66, a lever 170 normally disposed above the end of the tripping arm 138 of the hook pawl 136 for engagement therewith. This lever 170 is adapted to be depressed to trip the latch 136 and free the clutch operating lever when the dials 46 reach initial position. Because of the disposition of the parts in the apparatus as a whole, a generally rectangular U-shaped rocking member 172 is pivotally mounted upon one of the cross-rods 66 of the frame-work, the rod 66 passing through the arms of the rocking member. One arm of this rocking member carries, for convenience in manufacture, an extension 174 for engagement by the pin 166. The other arm of this rocking member carries the lock pawl disengaging arm 170, also for convenience in manufacture. When, therefore, as the pin 166 reaches initial position, it engages and depresses the end 174 on the rocking member 172 causing a corresponding depression of the end 170, which depresses the lock pawl arm 138 and causes the pawl 136 to disengage itself from the lug 132 on the clutch operating lever arm 130 permitting the clutch operating lever, therefore, to fall or turn in a counter-clockwise direction under the influence of the clutch spring 104, as the arm 96 is forced away from the arm 100, and allow the clutch elements (detent 92 and toothed wheel 90) to again become engaged.

As has been pointed out hereinbefore, the primary object of the present invention is to prevent the operator, in dispensing fluid, to halt the dial or other indicating means before it returns completely to initial position and start the delivery of fluid at a time when the dial already registers a quantity of fluid. If, therefore, before the dial reaches initial position the nozzle should be returned to its supporting lever for any reason, the clutch elements may become re-engaged, but this will be rare because in ordinary circumstances, the return to zero occurs faster than an operator can manually return the nozzle to its support. Even so, such manipulation will merely result in the stopping of the dial at that point and will not result in the delivery of liquid because the operation of the fluid elevating means (pump 26) is not initiated until the dial reaches zero and this initiation of the pump operation is not within the control of the operator. When, however, the dial rotates to initial position, the pin 166 not only releases the locking pawl 136 so as to permit the clutch 90, 92 to re-engage, but also causes the completion of the circuit through the motor whereby the motor may be started and the pump may be operated to elevate the fluid and cause its delivery. Therefore, because of the requirement that the actuation of the fluid elevating means 26 be not initiated until the indicating means 46 be returned to initial position, there is a lapse of time after the nozzle 22 is removed from the supporting lever 112 before the fluid elevating means 26 commences to function. On the other hand, the pump 26 must be stopped so soon as the nozzle is returned to its support, although the zero on the dial remains at a point away from the index. In the illustrated embodiment, therefore, the operation of the pump is controlled by a circuit adapted to be interrupted at two points, one set of contacts in the circuit being closed upon the removal of the nozzle from the hook and consequently opened when the nozzle is returned to the hook, and a second set of contacts in the circuit is closed in order to complete the circuit and start the pump motor when the indicating means returns to zero position, and which are opened when the indicating means leaves initial position.

Referring now to Figure 12, which shows a diagram of the electrical circuits which make the operations possible: One set of contacts or switch 124 is closed when the nozzle is taken off its support, while the other set of contacts or switch 125 is closed when the dial reaches initial position. In order that the motor 28 can operate, a gap in the motor circuit must be closed by the switches 151, 152, (for safety sake, four gaps are shown) and the closing of the contacts 151, 152 is accomplished by an electro-magnet or solenoid 149, the circuit of which is not completed until the second switch 125 is closed by the return of the dials to zero position. So soon as the dial 46 commences to record the delivery of fuel, its movement away from zero position opens the second switch 125 since the pressure by the pin 166 on the arm 71 is relieved and the spring 173 draws the rocking member downwardly, thereby rocking the end of the arm 170 upwardly and drawing upwardly, by means of link 175, the lever 141 controlling this switch 125 and thereby opening it. However, so long as the holding switch 124 is closed, the electro-magnet is energized and the motor circuit remains closed. When the nozzle is returned to its support, the holding switch 124 is opened, interrupting the holding circuit and the motor circuit is opened, stopping the fluid elevating devices immediately.

The holding switch 124 is closed in the following manner:

So soon as the nozzle is lifted from its support, the shaft 110 is adapted to be rotated under the influence of the spring 124 and this causes the arm 134, fixed thereon, to be turned in a counter-clockwise direction as viewed in Figure 9. This upward movement of the arm 134 draws up the link 177 which is connected with the arm 133 of a switch controlling bell crank 133, 135 pivotally mounted on the control box 38, the other arm 135 of which controls the contacts 124. The contacts 124 are thus closed immediately upon the removal of the nozzle from its support and thus one of the two switches in the holding circuit is closed.

The holding circuit is completed so that the pump will start delivering fluid as soon as the dials 46 are returned to zero position. The rocking lever 170 has connected to its end the link 175 leading downwardly to one arm 141 of a switch actuating bell crank 141, 142 pivotally mounted on the motor control box 38 containing the circuit closers and auxiliary devices of the motor circuit. When this link 175 is elevated by the upward movement of the lever 170 under the influence of the spring 173, the contacts 125 are opened. The contacts are held open or permitted to separate by virtue of their inherent resiliency. So soon as this switch 125 is closed by contact of pin 166 with the arm 174, the holding switch 124, being held closed, the holding circuit is established. Current then flows from the main 145, through contacts 125, line 146, through contacts 124, line 147, solenoid winding 149 and line 150 to the main 152. This circuit energizes the electro-magnet 149 thereby closing a series of contacts, to wit., contacts 151 of the motor circuit and a pair of contacts 153 in a holding circuit. In the holding circuit thus established, current flows from the main 145 through the contacts 153, line 154 and through the closed contacts 124, main 147 and solenoid winding 149 and line 150 to the negative main 152. The holding circuit remains established so long as contacts 124 remain closed and even though contacts 125 are open by the rotation of the dial from zero in recording the units of fluid delivered by the pump. (The movement of the pin 166 away from the arm 174 permits the spring 173 to pull up the link 175 and open the contacts 125.)

At the same time, the motor circuit is established since current flows from the main 145, line 155, contacts 151, line 156 to the motor 24, line 158, contacts 151 to the negative main 152.

When the zero on the indicator dial starts to move away from the index, the lever 170 and its link 175 raises under the influence of spring 173 and the contacts 125 are opened. However, due to the holding circuit, the solenoid remains energized to keep the motor circuit closed and the motor continues to run until the contacts 124 are opened on the return of the nozzle to its support, the depression of the supporting lever 112, of course, rotating the shaft 110 and arm 134 in a clockwise direction, depressing the link 177 and opening the circuits 124. This de-energizes the solenoid and the motor circuit is broken and the motor comes to rest stopping the pump.

During the delivery of fluid, as the meter shaft 68 rotates, the jack shaft 74 is rotated, which in turn rotates the dials 46 by means of the pinions 86, the pinions 86 and annular gears 72 being so proportioned that the numerals representing the several units of measure are brought past the index as units of fluid are delivered by the pump. While at the same time the stub shaft 54 is also rotated from the jack shaft 66 to indicate fractions of each unit as they are delivered. If at any time while the pump is operating, the valve should be closed and the pressure built up within the system, such pressure, after a predetermined maximum is reached, will open a suitable and well known pressure relief valve and permit the fluid to return to the reservoir from which it has been drawn through the pipe 30.

In order to give an audible indication of each unit of fluid passing through the meter 32, the jack shaft carries a cam 164, Figure 4, adapted to actuate the clapper 165 of a bell 166 as the jack shaft rotates in one direction when driven by the meter. When, however, the jack shaft is declutched from the meter in the opposite direction driven by the dials in their return to initial position, provision is made to permit the cam to ride past the clapper without causing its vibration. Pivotally mounted, say, upon a pin 168 a lever 169, 170' is free to rock. The downwardly extending arm 169 is adapted to be engaged by the shoulders 163 on the cam 164. The clapper 165 is attached to an upwardly extending clapper supporting lever 175, also adapted to rock on the pivot 168. The upwardly extending arm 170 of the rocking lever 169, 170 is held against the pin 173 by the spring 174 so that as the shoulders 163 on the cam 164 come into contact with the arm 169 of the lever, the arm 170 thereof will force the clapper supporting lever 175 and clapper 165 away from the bell and so soon as the shoulder 163 has ridden past the arm 169, the spring 185 will bring the clapper against the bell 166, as will be understood. Since the jack shaft 74 rotates once for every two units of measure of fluid delivered, the bell 166 is struck once for each half revolution of the jack shaft. When the jack shaft rotates in the opposite direction as the dials are returned to zero position, the shoulders 163 are permitted to ride past the clapper lever 175 by reason of the fact that the lever 169, 170 is free to rotate in a clockwise direction, as viewed in Figure 4, away from pin 173 against the action of spring 174 without, therefore, moving the clapper lever 175.

The rotation of the jack shaft is also utilized to operate mechanism registering the total amount of fluid delivered. Thus, each time the shoulder 163 on the cam 164 actuates the arm 169, in a counter-clockwise direction, a pin 176 on the clapper support 175 rocks the end of a lever 178, the other end of which is connected by a link 180 to any convenient type of totalizer 182. Thus when the jack shaft rotates through one-half revolution, the bell 166 is struck once for each unit of fluid measured by the meter and delivered by the nozzle, but when the jack shaft rotates in the opposite direction, the clapper is allowed to remain stationary so that no audible indication is given.

The operation of the registering device for liquid dispensing apparatus is apparent from the foregoing description. Briefly, the cycle of the operations for each transaction is as follows:

It may be assumed that the indicating means or dial occupies a position to which it has been moved from initial or zero position in a preceding transaction, so that a number representing the number of units of liquid delivered in the previous transaction is visible before the window. When the liquid delivery means, i. e., the nozzle and/or valve 22, is removed from its support 112 preparatory to delivering liquid in the subsequent transaction, the meter is disengaged from the indicating mechanism 46 so that the indicating mechanism may be automatically returned to zero. At the same time, a switch 124 in a holding circuit for the motor circuit is closed. The fluid elevating means 26 is not started, however, until the indicating means has returned to initial position. The clutch 90, 92 between the meter shaft 76 and the drive 74, 84, 72 for the indicating mechanism 46 is, therefore, held released until the indicating means 46 reaches initial position, at which time the meter 32 is again automatically clutched to the indicating mechanism 46 and the holding circuit for the motor circuit is closed and the motor commences to operate to actuate the fluid elevating means. The delivery of liquid, of course, actuates the meter thereby causing the movement of the indicating means away from the initial position to indicate the number of units of liquid delivered. The operation of the liquid elevating means continues until the fluid delivery means 22 is returned to its support 112 when the motor circuit is broken by interrupting the holding circuit by opening contacts 124, the meter remaining clutched to the indicating means whereby the indication of the number of units of liquid delivered in that transaction remains visible. There is thus an elapse of time between the removal of the fluid delivery means from its support until the fluid elevating means commences to operate. The elapsed time mechanism is illustrated as the return rotation of the indicating means to initial position, but it will be obvious that, in some circumstances, any suitable elapsed time means may be availed of whereby the operation of the fluid elevating means is delayed for any purpose after a cycle of operations commences.

Figures 10 and 11 show a control box 38 provided with suitable contacts and an electro-magnet, whereby the circuits may be controlled as illustrated in the diagram of Figure 12.

In the bottom of the box is formed a threaded opening 210 for the reception of a conduit 214 through which may pass the leads 145 and 152 as well as the wires 156, 158 to the motor 28. A panel 216 within the box 38 supports in suitable fashion the various stationary contacts and the electro-magnet. The armature 212 of the electro-magnet preferably has pivotally mounted thereon a rod 213 upon which the several movable contacts of the switches 151, 151 and 152 are mounted. While it will be obvious that a single set of contacts in the motor circuit 155, 151, 156, 158, 151 is sufficient for the purpose of controlling that circuit, in order to meet the requirements of fire underwriters, the motor circuit is interrupted at four points as shown, and, similarly, the motor control circuit is interrupted at two points, 153, 153. The shafts 217, 218 upon which are the levers 134 and 142 operating the contacts 125, 124, are shown conveniently journalled in the cover 39 for the box.

It will thus be seen that a fluid metering device has been provided which is suitable for dispensing gasoline and other motor fuels at wayside service stations. It is adaptable to housings of different configuration and design so that different distributors may adopt distinctive housings without necessitating a change in the construction of the operating mechanism. Only the total number of units of fluid delivered in a particular transaction is visible alike to purchaser and attendant and such indication remains visible until the next sale, so that all chance of confusion is eliminated. Furthermore, the return of the indicating dial to zero position is entirely automatic, all mechanism being so enclosed as to preclude tampering by a dishonest dealer. Both the return of the dial to initial position and the starting of the pump are initiated by the removal of the nozzle from its support and the hose is filled with fluid at all times thus assuring the purchaser full measure.

Various modifications will occur to those skilled in the art in the disposition and configuration of the component elements going to make up this invention as a whole as well as in the selection and/or combinations of certain of the features independently of others or the substitution therefor of other means accomplishing the same result, and no limitation is intended by the phraseology of the foregoing description or illustrations in the accompanying drawings, except as indicated in the appended claims.

What is claimed is:

1. In fluid dispensing apparatus having fluid flow establishing means, fluid metering means, in combination, indicating means, operative connections between the indicating means and the metering means comprising clutch means and a clutch operating lever, and releasable clutch lever holding means to move the clutch lever.

2. In fluid dispensing apparatus having fluid flow establishing means, a meter and fluid delivery means, in combination, indicating means, operative connections between the indicating means and the meter comprising clutch means, a movable support for the fluid delivery means and clutch releasing means adapted to be controlled by the support.

3. In fluid dispensing apparatus having fluid flow establishing means, a meter and fluid delivery means, in combination, indicating means, operative connections between the indicating means and the meter comprising clutch means, a movable support for the fluid delivery means, clutch releasing means adapted to be controlled by the support, means to move said clutch releasing means comprising retaining means for the clutch releasing means.

4. In fluid dispensing apparatus having fluid flow establishing means, a meter and fluid delivery means, in combination, indicating means, operative connections between the indicating means and the meter comprising clutch means, a movable support for the fluid delivery means, clutch releasing means adapted to be controlled by the support, means to move said clutch releasing means, and retaining means for the clutch releasing means.

5. In fluid dispensing apparatus having fluid flow establishing means, a meter and fluid delivery means, in combination, indicating means, a meter shaft, operative connections between the meter shaft and the indicating means comprising clutch mechanism, a clutch actuating lever, a movable support for the fluid delivery means, rocking means adapted to be engaged by the movable support and having means to engage the clutch actuating lever to move the same to disengage the clutch.

6. In fluid dispensing apparatus having fluid flow establishing means, a meter and fluid delivery means, in combination, indicating means, means to return the indicating means to initial position, a meter shaft, operative connections between the meter shaft and the indicating means comprising clutch mechanism, a clutch actuating lever, means adapted to be rocked in one direction by the delivery means, a latching pawl carried with the rocking means to engage the clutch actuating lever to move the same to disengage the clutch and release the meter shaft from the indicating means and permit the indicating means to be returned to initial position.

7. In fluid dispensing apparatus having fluid flow establishing means, a meter and fluid delivery means, in combination, indicating means, means to return the indicating means to initial position, a meter shaft, operative connections between the meter shaft and the indicating means, comprising clutch mechanism, a clutch actuating lever, means adapted to be rocked in one direction by the weight of the delivery means, a hook pawl carried with the rocking means to engage the clutch actuating lever to move the same to disengage the clutch and release the meter shaft from the meter and permit the indicating means to be returned to initial position, said returning means being adapted to release the hook pawl from the clutch lever when the indicating means has returned to initial position.

8. In fluid dispensing apparatus having fluid flow establishing means, a meter and fluid delivery means, in combination, indicating means, means to return the indicating means to initial position, a meter shaft, operative connections between the meter shaft and the indicating means comprising clutch mechanism, a clutch actuating lever, fluid delivery means, rocking means movable in one direction by the delivery means, a hook pawl carried with the rocking means to engage the clutch actuating lever to move the same to disengage the clutch and release the meter shaft from the meter and permit the indicating means to be returned to initial position, a second rocking means adapted to be moved in one direction by the returning means to disengage the hook pawl.

9. In fluid dispensing apparatus having fluid flow establishing means, a meter and fluid delivery means, in combination, indicating means, means to return the indicating means to initial position, a jack shaft, operative connections between the jack shaft and the indicating means, operative connections between the jack shaft and meter comprising clutch mechanism, a movable support for the fluid delivery means, a rock shaft, a clutch actuating lever freely rotatable on the shaft, an arm fixed thereon adapted to be engaged by the movable support, a second arm fixed thereon, a hook pawl having a tripping arm and carried with the second arm to engage the clutch actuating lever to move the same to disengage the clutch, and release the jack shaft from the meter and permit the indicating means to be returned to initial position, a rocking member having an arm engageable by the returning means and a second arm to engage the tripping arm on the hook pawl and cause it to disengage the clutch actuating lever and permit the clutch to reengage.

10. In fluid dispensing apparatus having fluid flow establishing means, a meter and fluid delivery means, in combination, indicating means, means to return the indicating means to initial position, a jack shaft, operative connections between the jack shaft and the indicating means, operative connections between the jack shaft and meter comprising clutch mechanism, a movable support for the fluid delivery means, a rock shaft, a clutch actuating lever freely rotatable on the shaft, an arm fixed thereon adapted to be engaged by the movable support, spring means to rock the shaft in the opposite direction, a second arm fixed thereon, a hook pawl having a tripping arm and carried with the second arm to engage the clutch actuating lever to move the same to disengage the clutch, and release the jack shaft from the meter and permit the indicating means to be returned to initial position, a rocking member having an arm engageable by the returning means and a second arm to engage the tripping arm on the hook pawl and cause it to disengage the clutch actuating lever and permit the clutch to reengage, and spring means to rock the member in the opposite direction away from the arm on the hook pawl.

11. In fluid dispensing apparatus having fluid flow establishing means, a meter and fluid delivery means, in combination, indicating means, operative connections between the indicating means and the meter comprising clutch means, a movable support for the fluid delivery means, clutch releasing means adapted to be controlled by the support, and retaining means for the clutch releasing means.

12. In fluid dispensing apparatus having fluid elevating means, fluid metering means and fluid delivery means, in combination, indicating means, operative connections between the indicating means and the metering means comprising clutch means, rocking means comprising a disengageable means to release the clutch, means to return the indicating means to initial position, a second rocking means adapted to be rocked by the returning means at initial position to cause the release of the clutch, a switch in the motor circuit, switch operating means, a link between the switch operating means and the first rocking means, a second switch, operating means therefor, a link between the second rocking means and said last named switch operating means to close said switch when the returning means returns to initial position.

13. In fluid dispensing apparatus having fluid elevating means, fluid metering means and fluid delivery means, in combination, indicating means, a jack shaft, operative connections between the jack shaft and the indicating means, operative connections between the metering means and the jack shaft comprising clutch means, means normally retaining the clutch elements in engagement, an operating shaft, a bell crank loosely mounted on the operating shaft and having one arm adapted to release the clutch, a lug on the other arm, a pivoted support for the delivery means, an operating shaft controlled by said support, means tending to rock the operating shaft in one direction, an arm fixed on the operating shaft proximate the second arm of the clutch operating bell crank, a hook pawl comprising a tripping arm and pivoted on said arm and adapted to engage the lug on the clutch operating bell crank to rotate the same to disengage the clutch, means normally tending to cause the hook pawl to engage the lug, a gear rotating with the indicating means, a segmental gear in mesh therewith, a spring to rotate the segmental gear to return the indicating means to initial position, a pin on the segmental gear, a three sided rectangular pivoted rocking frame, means normally tending to rock said frame in one direction, one side of said frame being adapted to be depressed against the spring by the pin on the segmental gear at initial position, the other side of said frame being disposed over an arm on the hook pawl to depress the same and cause the release of the clutch operating lever.

14. In fluid dispensing apparatus having fluid elevating means, fluid metering means and fluid delivery means, in combination, indicating means, a jack shaft, operative connections between the jack shaft and the indicating means, operative connections between the metering means and the jack shaft comprising clutch means, means normally retaining the clutch elements in engagement, an operating shaft, a bell crank loosely mounted on the operating shaft and having one arm adapted to release the clutch, a lug on the other arm, a pivoted support for the delivery means, an operating shaft controlled by said support, means tending to rock the operating shaft in one direction, an arm fixed on the operating shaft proximate the second arm of the clutch operating bell crank, a hook pawl comprising a tripping arm and pivoted on said arm and adapted to engage the lug on the clutch operating bell crank to rotate the same to disengage the clutch, means normally tending to cause the hook pawl to engage the lug, a gear rotating with the indicating means, a segmental gear in mesh therewith, a spring to rotate the segmental gear to return the indicating means to initial position, a pin on the segmental gear, a three sided rectangular pivoted rocking frame, means normally tending to rock said frame in one direction, one side of said frame being adapted to be depressed against the spring by the pin on the segmental gear at initial position, the other side of said frame being disposed over an arm on the hook pawl to depress the same and cause the release of the clutch operating lever, a switch in the motor circuit, switch operating means, a link between the switch operating means and the second arm on the operating shaft to close the same when the spring turns the operating shaft, a second switch, operating means therefor, a link between an arm of the rocking frame and said last named switch operating means to close said switch when the returning means returns to initial position.

15. In fluid dispensing apparatus having fluid elevating means, fluid metering means and fluid delivery means, in combination, indicating means, a jack shaft, operative connections between the jack shaft and the indicating means, operative connections between the metering means and the jack shaft comprising clutch means, a spring normally retaining the clutch elements in engagement, an operating shaft, a bell crank loosely mounted on the operating shaft and having one arm adapted to release the clutch, a lug on the other arm, a pivoted support for the delivery means, a bell crank fixed on the operating shaft whereof one arm extends beneath the support, a spring connected to the other arm and tending to rock the operating shaft in one direction, another arm fixed on the operating shaft proximate the second arm of the clutch operating bell crank, a T-shaped hook pawl comprising a tripping arm and pivoted on said arm and adapted to engage the lug on the clutch operating bell crank to rotate the same to disengage the clutch, a spring between the second arm and the hook pawl normally tending to cause the hook pawl to engage the lug, a gear rotating with the indicating means, a segmental gear in mesh therewith, a spring to rotate the segmental gear to return the indicating means to initial position, a pin on the segmental gear, a three sided rectangular pivoted rocking frame, and a spring normally tending to rock said frame in one direction, one side of said frame being adapted to be depressed against the spring by the pin on the segmental gear at initial position, the other side of said frame being disposed over an arm on the hook pawl to depress the same and cause the release of the clutch operating lever.

16. In fluid dispensing apparatus having fluid elevating means, fluid metering means and fluid delivery means, in combination, indicating means, a jack shaft, operative connections between the jack shaft and the indicating means, operative connections between the metering means and the jack shaft comprising clutch means, a spring normally retaining the clutch elements in engagement, an operating shaft, a bell crank loosely mounted on the operating shaft and having one arm adapted to release the clutch, a lug on the other arm, a pivoted support for the delivery means, a bell crank fixed on the operating shaft whereof one arm extends beneath the support, a spring connected to the other arm and tending to rock the operating shaft in one direction, another arm fixed on the operating shaft proximate the second arm of the clutch operating bell crank, a T-shaped hook pawl comprising a tripping arm and pivoted on said arm and adapted to engage the lug on the clutch operating bell crank to rotate the same to disengage the clutch, a spring between the second arm and the hook pawl normally tending to cause the hook pawl to engage the lug, a gear rotating with the indicating means, a segmental gear in mesh therewith, a spring to rotate the segmental gear to return the indicating means to initial position, a pin on the segmental gear, a three sided rectangular pivoted rocking frame, a spring normally tending to rock said frame in one direction, one side of said frame being adapted to be depressed against the action of the spring by the pin on the segmental gear at initial position, the other side of said frame being disposed over a tripping arm on the hook pawl to depress the same and cause the release of the clutch operating lever, a switch in the motor circuit, switch operating means, a link between the switch operating means and the second arm on the operating shaft to close said switch when the spring turns the operating shaft, a second switch, operating means therefor, a link between an arm of the rocking frame and said last named switch operating means to close said switch when the segmental gear returns to initial position.

17. A liquid dispensing system including a pump and driving means therefor, a liquid meter for measuring the dispensed liquid, an indicator driven by the meter and having a predetermined initial position, and interlocking means operated by the driving means and indicator for preventing the resetting of said indicator while the said driving means is in operative condition and for preventing the energization of said driving means when said indicator is in other than initial position.

18. A liquid dispensing system including a pump and driving means therefor, a liquid meter for measuring the dispensed liquid, an indicator driven by the meter, and means for preventing the resetting of said indicator while the said driving means is driving said pump.

19. A liquid dispensing system including a pump and an electric motor for driving the same, a switch through which the motor may be energized, a liquid meter for measuring the liquid dispensed, a resettable indicator driven by said meter having a predetermined initial position, and means operated with said switch for preventing the resetting of said indicator while said switch is closed.

20. A liquid dispensing system including a pump and driving means therefor including a control element, a dispensing conduit for receiving liquid from said pump, a liquid meter connected to said conduit for measuring the dispensed liquid, an indicator driven by the meter, means for resetting said indicator, and a device for preventing resetting movement of said resetting means and actuated with said driving means so that resetting cannot occur when said element is in position for the operation of said pump.

21. A liquid dispensing system including a dispensing conduit, means for producing a flow of liquid into said conduit and including an element for controlling said means, a liquid meter connected to said conduit for measuring the dispensed liquid, an indicator driven by the meter, means for resetting said indicator, and a device for preventing resetting movement of said resetting means and connected for operation with said control element so that resetting cannot occur while the said element is in position for effecting a flow of liquid into said conduit.

22. A liquid dispensing system including a pump and an electric motor for driving the same, a switch through which the motor may be energized, a liquid meter for measuring the liquid dispensed, a resettable indicator driven by said meter having a predetermined initial position, and means operated with said switch for preventing the resetting of said indicator while said switch is closed and operated by the departure of the indicator from initial position to prevent the closing of the switch.

23. A liquid dispensing system including a pump and an electric motor for driving the same, a switch through which the motor may be energized, a liquid meter for measuring the liquid dispensed, a resettable indicator driven by said meter having a predetermined initial position, a movable limit member for determining said initial position in resetting, and a device moved with the switch, said limit member being moved by the indicator at its departure from initial position into interlocking relationship with said device whereby to prevent a reclosing of the switch until the indicator has been reset into initial position.

24. A liquid dispensing system including a liquid meter, a resettable indicator driven by said meter, means for producing a flow of liquid through said meter and including a control element therefor, means for resetting said indicator, and a device for preventing resetting movement of said means and connected to said control element so that resetting cannot occur while the control element is in position for effecting a flow of liquid through said meter.

25. A liquid dispensing system including a discharge conduit for liquid, means for delivering liquid into said conduit and including a device for effecting and stopping said delivery, means for measuring the flow of liquid through said conduit, an indicator driven by said measuring means, and means controlled by said device for preventing the resetting of said indicator while said device is in effecting position.

26. A liquid dispensing system including a discharge conduit for liquid, means for delivering liquid into one end of said conduit so that a flow may be induced therethrough and including a device for effecting and stopping said delivery, a flow meter for measuring the flow of liquid through the conduit and actuated by the movement of liquid therethrough, an indicator driven by said meter, and means controlled by said device for preventing the resetting of said indicator while said device is in effecting position.

27. In a liquid dispensing apparatus, the combination of power means for dispensing liquid, control means for controlling operation of said power means including mechanism manually movable for initiating operation of said power means, registering mechanism for indicating the amount of liquid dispensed, said control means and said registering mechanism having members for controlling said first named mechanism, said members being engageable when said registering mechanism is in a predetermined position and released when said members have been relatively moved.

HARRY T. GOSS.